J. P. LOVETT & F. P. LEFEVRE.
Harness Pads.
No. 133,786.                                            Patented Dec. 10, 1872.
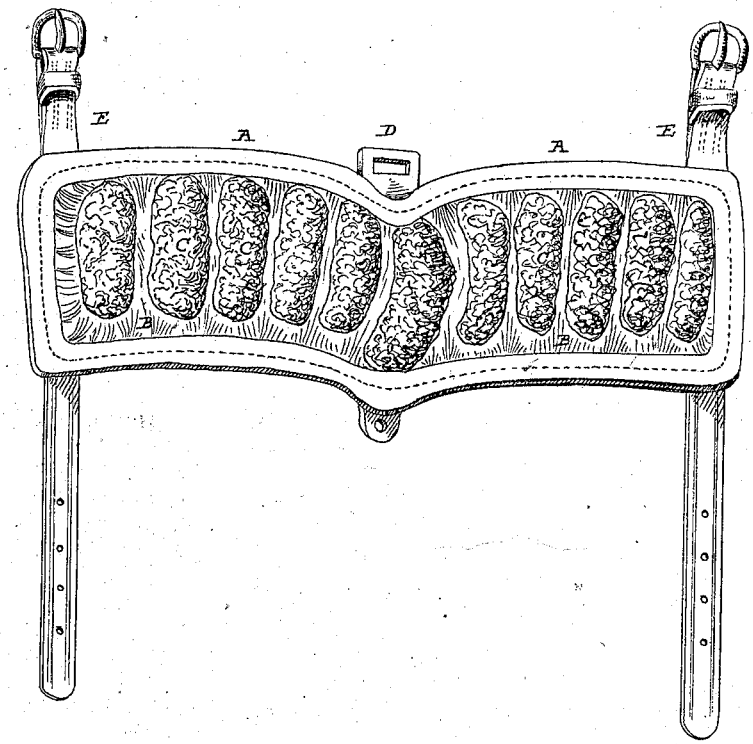

UNITED STATES PATENT OFFICE.

JOHN P. LOVETT AND FRANK P. LEFEVRE, OF OXFORD, PENNSYLVANIA.

IMPROVEMENT IN HARNESS-PADS.

Specification forming part of Letters Patent No. 133,786, dated December 10, 1872.

*To all whom it may concern:*

Be it known that we, JOHN P. LOVETT and FRANK P. LEFEVRE, of Oxford, in the county of Chester and State of Pennsylvania, have invented a certain Improved Pad to Prevent and Cure Galls on Horses, of which the following is a specification:

The object of our invention is to provide a pad to prevent not only the galling or excoriation of the skin occasioned by the friction of saddles, harness, and the like on horses—especially when perspiring freely—but, by its absorbent quality, take up the moisture excreted from the skin, and, by its traction, prevent friction, and also answer as a remedial agent to effect a cure on animals already galled.

The accompanying drawing illustrates a pad to put under the saddle of harness.

A brief explanation will enable any one skilled in the art to make and apply our invention.

The pad A or outer surface has a pliant lining, B, which is put on so as to allow of being stuffed. The outer or lower ends may be closed by sewing across; centrally, the lining should be open. This lining has large oblong pieces cut out, with a narrow strip left standing so as to form, say, five, or more or less, openings. This lining is now stuffed with pieces of sponge C, cut to size and shape, and so that the sponge projects through the meshes or open spaces in order to come in contact with the skin of the animal. The projecting portion of the sponge will spread so as to cover the narrow intervening strips of the lining and form a smooth, soft, moisture-absorbing surface, which, by its traction, will remain in position and prevent friction, the side straps E simply holding the pad in place, allowing the motion of the harness to act freely without communicating a corresponding motion to the pad. By thus absorbing the perspiration, and preventing friction and chafing, the cause of galling is completely obviated, and the consequences prevented.

When the sponge becomes saturated with sweat it can be easily removed, washed, dried, and replaced, and is as efficient as when first applied. The sponge can also be medicated, so as to produce a perfect cure on horses already galled (even while using them) in the course of a few days. These pads can be adapted to collars or riding-saddles, in short, to and for any position subject to galling.

We, therefore, do not confine ourselves to any precise form of the openings, or size or manner of attaching our pad. Neither do we claim the sponge for absorbing moisture, as that is a property well known; but we are not aware that it has ever been used as a stuffing for pads substantially in the manner specified.

These pads can be made and put on sale as a new article of manufacture, and prove a great benefit to suffering animals as well as to their owners; therefore, What we deem novel, and desire to secure by Letters Patent, is—

A pad, A, with openings or meshes in the lining B stuffed with sponge C, substantially as and for the purpose specified.

JOHN P. LOVETT.
       F. P. LEFEVRE.

Witnesses:
 F. P. ASH,
 PATTERSON LOVETT.